UNITED STATES PATENT OFFICE.

NIELS C. CHRISTENSEN, OF SALT LAKE CITY, UTAH, ASSIGNOR TO METALLURGIC IMPROVEMENT CORPORATION, OF SALT LAKE CITY, UTAH, A CORPORATION OF UTAH.

PROCESS OF TREATING COPPER ORES BY SULFATIZATION AND FLOTATION.

1,316,352. Specification of Letters Patent. Patented Sept. 16, 1919.

No Drawing. Application filed April 3, 1918, Serial No. 226,521. Renewed May 22, 1919. Serial No. 299,072.

*To all whom it may concern:*

Be it known that I, NIELS C. CHRISTENSEN, a citizen of the United States, residing at No. 637 E. 9 South, in Salt Lake City, in the county of Salt Lake and State of Utah, have invented a new Process of Treating Copper Ores by Sulfitization and Flotation, of which the following is a specification.

This invention relates to a new process for the treatment of copper ores. It is particularly adapted to ores containing the copper in an oxidized condition but is also applicable to ores in which part of the copper is oxidized and part sulfid. My process recovers the copper from these ores by a new combination of chemical and mechanical steps making use of hitherto unknown and unused properties of some copper compounds. These compounds are two, namely, the red cupro cupric sulfite such as is formed by precipitation on boiling off the excess $SO_2$ from an $SO_2$ solution in which are dissolved oxidized copper compounds, or by the action of a hot $SO_2$ gas upon the oxidized copper minerals in the presence of moisture at a temperature at or somewhat below the boiling point of water, and the basic copper sulfate which may be formed by treating a warm $CuSO_4$ solution with $CaCO_3$.

The red crystalline cupro-cupric sulfite precipitate possesses the property of "flotation" in a very high degree and when an oily froth is formed in a pulp containing it this sulfite separates excellently from its gangue and is carried to the surface with the froth to which it gives a bright red color. The above mentioned flocculent green basic sulfate precipitate also possesses the property of flotation and is carried to the surface by the froth to which it gives a light green color. With this latter the action is somewhat slower, due to the different physical condition of the two precipitates.

The method of utilizing these properties in my process is as follows: The ore ground to suitable mesh is moistened with sufficient water to give a porous mass readily permeable by the gas. The amount of water used will vary with the character of the ore and the fineness of grinding. The moistened ore is then treated with $SO_2$ gas at a temperature somewhat below the boiling point of water. The action of the $SO_2$ gas at temperatures approaching the boiling point of water is to convert the copper minerals to the cupro-cupric sulfite as illustrated in the following re-action, wherein the expression Cu"O" is used as a type radical to indicate the combined form of copper present in the mineral.

which should probably be regarded as a contraction of the two following reactions.

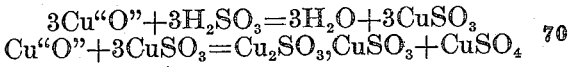

the reaction might also be written:

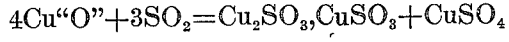

but this would not properly represent the true condition as the reaction does not take place except in the presence of moisture. The action of the hot $SO_2$ gas and moisture is relatively rapid and if the ore is finely ground may convert all the copper according to the reaction given, but if a shorter time of treatment is used, or the proportion of moisture is limited, may merely coat the mineral particles with the cupro-cupric sulfite which coating serves the same purpose in the subsequent separation by flotation as does complete sulfitizing. In the treatment of the ore by this method, as the action commences, the pulp turns a light violet color, and then gradually turns red and if the pulp becomes dry after being sulfitized it turns pink. Upon moistening the red color returns again. It is advantageous in this sulfitizing treatment to merely coat the mineral particles if possible with just enough of a sufficiently coherent layer of the sulfite to make the particle float and thus avoid the formation of much copper sulfate. Precaution should also be taken that no air be admitted during the sulfitizing process, and if the $SO_2$ gases contain $SO_3$ this latter should be removed before using the $SO_2$ gas in the process. These precautions are necessary in order to prevent the formation of much sulfate. Before the pulp goes to the flotation treatment the excess $SO_2$ should be removed by heating. This sulfitizing treatment is best carried out in a revolving drum or other such apparatus in which the ore may be agitated and mixed so that all the particles come in contact with the $SO_2$ gas.

The sulfitizing treatment being completed and the excess $SO_2$ driven off, the ore is next treated by flotation to separate the cupro-cupric sulfite and particles of mineral coated with the cupro-cupric sulfite. The sulfitized pulp is mixed with sufficient water to make a relatively dilute pulp of the proper proportions of water and ore, and a small quantity of a suitable oily frothing agent is added and thoroughly mixed with the pulp. The pulp is then aerated and agitated in such a manner as to form a froth which carries the sulfite to the surface of the pulp and permits its removal from the remainder of the ore. The froth in this case is a bright red color and holds the sulfite very well.

The recovery of the copper from the $CuSO_4$ formed may be carried out as at present developed in three different ways. $CaCO_3$ may be added to the hot pulp before it is diluted with too much water and the green basic sulfate be precipitated in the pulp. In this case the froth in the flotation machine will be lighter in color due to the mixture of the sulfite and the green basic sulfate. Or the sulfite may first be removed by flotation and the pulp warmed and the $CuSO_4$ precipitated with $CaCO_3$ and the basic sulfate be removed in another flotation operation. In this case the froth in the first treatment will carry nothing but the sulfite and will be a bright red in color and the second treatment the froth will carry only the basic sulfate and will be a light green. Or the $CuSO_4$ may also be removed by washing the pulp after the sulfitizing treatment and the filtrate treated for the recovery of the copper by any suitable method. The precipitation with limestone is easily and cheaply carried out. Where it is not necessary to secure a very high grade product the basic sulfate should be "floated" with the cupro-cupric sulfite.

The precipitation of the $CuSO_4$ takes place as shown in the following chemical equation:

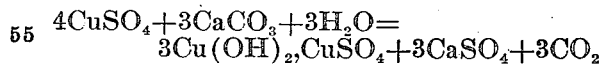

The emulsification, aeration, formation and removal of the froth may be carried out by the mechanical heating of air into the pulp or by passing air through a porous membrane into the pulp, or a combination of these, and the entire process of flotation may be carried out in any of the forms of apparatus successfully used in the "sulfid flotation" process.

That the process has a wide field of application will be evident from the following statement of some of its applications.

Ores containing the copper as the carbonate yield very readily to this process. The clean sandstone ores which occur abundantly in certain parts of the western United States are especially suited to this treatment. Test on some of these ores show extractions as high as 95% with this process.

Ores containing the copper partly as carbonate and partly as sulfid are well suited for treatment by this process as the oxidized part of the copper is not only saved but the sulfids are cleaned so as to float very readily.

Ores containing the copper partly as red oxid, of which there are many examples in the States of Utah, Colorado and Arizona, etc., are well suited for treatment by this process as the sulfitizing treatment makes possible the flotation of all the copper, whereas a leaching process has difficulty in dissolving more than half of the copper.

Ores containing the copper as a mixture of chalcocite, cuprite, azurite and malachite are amenable to no other simple form of treatment, but by this process the entire copper content may be saved. Many deposits in south-eastern Utah and adjoining portions of Arizona and Colorado have ore of this character.

The brief description of the process and its applications, possible in the scope of a patent application cannot possibly cover the entire range of modifications and adaptations of my invention, and I therefore do not wish to be limited entirely by the foregoing description but by its spirit and scope as set forth in the following claims:

In the claims I have used the term "sulfitize" to mean the complete changing of the copper compounds in the ore to the cupro-cupric sulfite or the coating of the particles of copper mineral with the cupro-cupric sulfite, as flotation of the copper is effected in the same way in either case. The term flotation is now a term of such common usage as to need no explanation.

Having described my process what I claim as new and desire to patent is:

Claims:

1. The process of treating copper ores for the recovery of the copper therefrom, which consists in treating the moist ore with $SO_2$ gas and heat, thereby converting copper therein to cupro-cupric sulfite and thereafter separating the cupro-cupric sulfite from the remainder of the ore by a process of flotation.

2. The process of treating copper ores for the recovery of the copper therefrom which consists in subjecting the moist ore to the action of $SO_2$ gas and heat thereby coating particles of copper minerals therein with cupro-cupric sulfite and separating the said coated mineral particles from the remainder of the ore by a process of flotation.

3. The process of treating copper ores for the recovery of the copper therefrom which consists in subjecting the moist ore to the action of $SO_2$ gas and heat thereby converting copper therein to cupro-cupric sulfite and coating particles of copper minerals therein with cupro-cupric sulfite and separating the cupro-cupric sulfite and the said coated mineral particles from the remainder of the ore by a process of flotation.

4. The process of treating copper ores for the recovery of the copper therefrom which consists in treating the moist ore with $SO_2$ gas at a temperature approaching the boiling point of water thereby converting copper therein to cupro-cupric sulfite and separating the cupro-cupric sulfite from the remainder of the ore by a process of flotation.

5. The process of treating copper ores for the recovery of the copper therefrom which consists in treating the moist ore with $SO_2$ gas at a temperature approaching the boiling point of water thereby coating particles of copper minerals therein with cupro-cupric sulfite and separating the said coated mineral particles from the remainder of the ore by a process of flotation.

6. The process of treating copper ores for the recovery of the copper therefrom which consists in treating the moist ore with $SO_2$ gas at a temperature approaching the boiling point of water thereby converting copper therein to cupro-cupric sulfite and coating particles of copper minerals therein with cupro-cupric sulfite and the cupro-cupric sulfite and separating the said coated mineral particles from the remainder of the ore by a process of flotation.

7. The process of treating copper ores for the recovery of the copper therefrom which consists in treating the moist ore with $SO_2$ gas at a temperature approaching the boiling point of water and converting copper therein to cupro-cupric sulfite and removing the $CuSO_4$ formed during said treatment and separating the cupro-cupric sulfite from the remainder of the ore by a process of flotation.

8. The process of treating copper ores for the recovery of the copper therefrom which consists in subjecting the moist ore to the action of $SO_2$ gas and heat thereby converting copper therein to cupro-cupric sulfite and precipitating the copper from $CuSO_4$ formed during said treatment as basic copper sulfate by adding limestone to the pulp, and separating the cupro-cupric sulfite and the basic copper sulfate from the remainder of the ore by a process of flotation.

9. The process of treating copper ores for the recovery of the copper therefrom which consists in treating the moist ore with $SO_2$ gas at a temperature approaching the boiling point of water thereby converting copper therein to cupro-cupric sulfite and precipitating the copper from the $CuSO_4$ formed during said treatment as basic copper sulfate by adding limestone to the pulp and separating the cupro-cupric sulfite from the remainder of the ore by a process of flotation.

10. The process of treating copper ores for the recovery of the copper therefrom which consists in treating the moist ore with $SO_2$ gas at a temperature approaching the boiling point of water and converting copper therein to cupro-cupric sulfite and coating particles of copper minerals therein with cupro-cupric sulfite and precipitating the copper from the $CuSO_4$ formed during said treatment by adding limestone to the pulp and separating the cupro-cupric sulfite, the said coated mineral particles and the basic copper sulfate from the remainder of the ore by a process of flotation.

11. The process of treating copper ores for the recovery of the copper therefrom which consists in treating the moist ore with $SO_2$ gas, agitating the moistened ore in the presence of $SO_2$ gas, at a temperature approaching the boiling point of water and converting copper therein to cupro-cupric sulfite and diluting the pulp with water and separating the cupro-cupric sulfite from the remainder of the ore by a process of flotation.

12. The process of treating copper ores for the recovery of the copper therefrom which consists in treating the moist ore with $SO_2$ gas, agitating the moistened ore in the presence of $SO_2$ gas at a temperature approaching the boiling point of water and coating particles of copper minerals therein with cupro-cupric sulfite, and diluting the pulp with water and separating the cupro-cupric sulfite from the remainder of the ore by a process of flotation.

13. The process of treating copper ores for the recovery of the copper therefrom which consists in treating the moist ore with $SO_2$ gas, agitating the moistened ore in the gas at a temperature approaching the boiling point of water and converting copper therein to cupro-cupric sulfite and coating particles of copper minerals therein with cupro-cupric sulfite, and diluting the pulp with water and separating the cupro-cupric sulfite from the remainder of the ore by a process of flotation.

14. In the process of treating copper ores for the recovery of the copper therefrom which consists in agitating the moistened ore in the presence of $SO_2$ gas at a temperature approaching the boiling point of water and converting copper therein to cupro-cupric sulfite, and diluting the pulp with water, and converting the $CuSO_4$ formed during said treatment to basic copper sulfate, and separating the cupro-cupric sulfite and the basic copper sulfate from the remainder of the ore by a process of flotation.

15. The process of treating copper ores for the recovery of the copper therefrom which consists in agitating the moistened ore in the presence of $SO_2$ gas at a temperature approaching the boiling point of water and converting copper therein to cupro-cupric sulfite, and diluting the pulp with water, and precipitating the copper from the $CuSO_4$ formed during said treatment as basic copper sulfate by adding limestone to the pulp, and separating the cupro-cupric sulfite and the basic copper sulfate from the remainder of the ore by a process of flotation.

16. The process of treating copper ores for the recovery of the copper therefrom which consists in agitating the moistened ore in the presence of $SO_2$ gas, from which $SO_3$ has been removed, at a temperature approaching the boiling point of water and converting copper therein to cupro-cupric sulfite and separating the cupro-cupric sulfite from the remainder of the ore by a process of flotation.

17. The process of treating copper sulfate-containing values which comprises converting the copper sulfate into basic copper sulfate and separating the basic copper sulfate by flotation.

18. The process of treating converted copper ores containing copper sulfate which comprises treating said ores with calcium compounds in the presence of water, thereby converting said sulfate into basic copper sulfate, and separating the basic copper sulfate by flotation.

19. The process of treating converted copper ores containing copper sulfate which comprises treating said ores with limestone in the presence of water, thereby converting said sulfate into basic copper sulfate, and separating the basic copper sulfate by flotation.

20. The process of treating copper ores for the recovery of the copper therein which comprises converting the copper therein into cupro-cupric sulfite and copper sulfate, separating the cupro-cupric sulfite by flotation, and converting the copper sulfate in the residual pulp into basic copper sulfate, and separating the basic copper sulfate by flotation.

21. The process of treating copper ores for the recovery of the copper therein which comprises converting copper therein into cupro-cupric sulfite and copper sulfate, removing said copper sulfate by solution and separating the cupro-cupric sulfite by flotation.

22. The process of treating copper ores for the recovery of the copper therein which comprises converting copper therein into cupro-cupric sulfite and copper sulfate, converting said copper sulfate into basic copper sulfate, and separating said cupro-cupric sulfite and basic copper sulfate by flotation.

NIELS C. CHRISTENSEN.

Witnesses:
 THEODORE SKIBBINS,
 MARY WOOD.